May 15, 1956     E. O. SCHWEITZER     2,745,711
STRIP CHART RECORDER
Filed Aug. 8, 1952     2 Sheets-Sheet 1
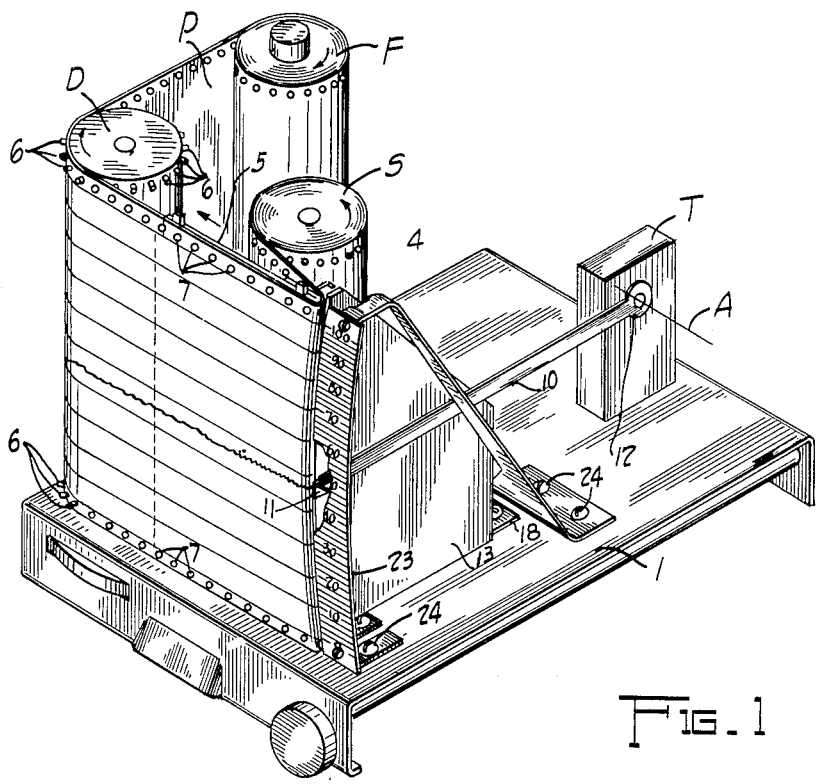
FIG. 1
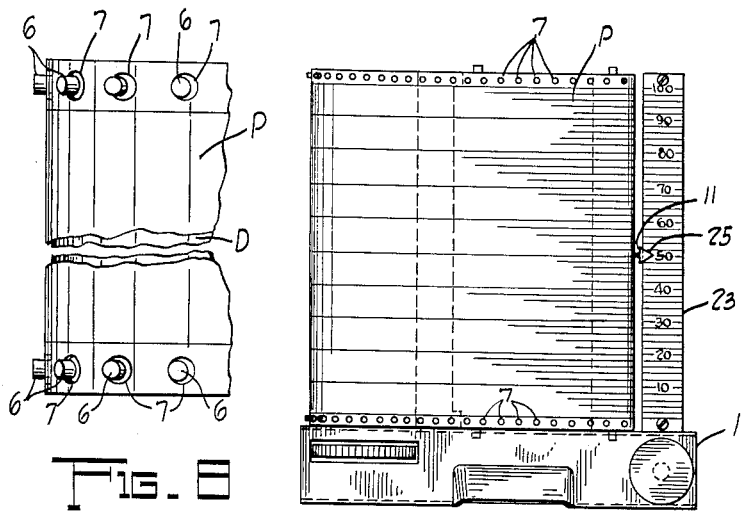
FIG. 3
FIG. 2
INVENTOR.
EARL O. SCHWEITZER
BY
ATTORNEY May 15, 1956  E. O. SCHWEITZER  2,745,711
STRIP CHART RECORDER
Filed Aug. 8, 1952  2 Sheets-Sheet 2
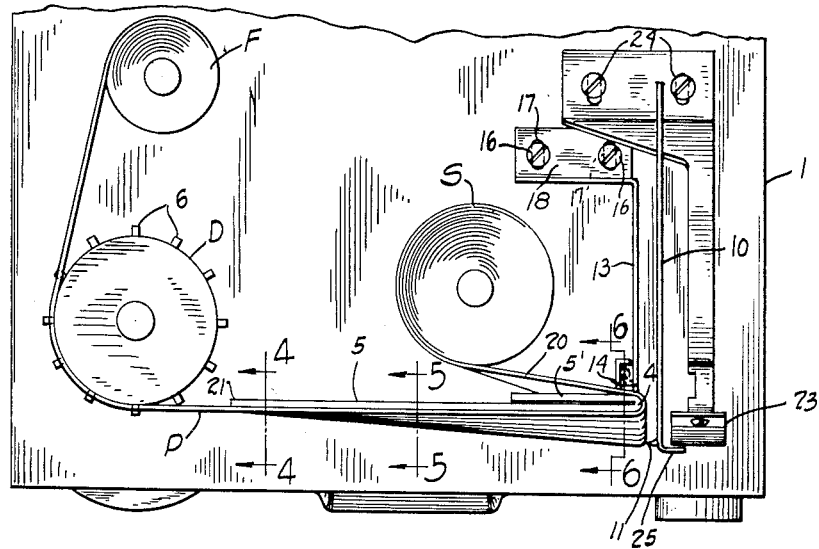
Fig. 3
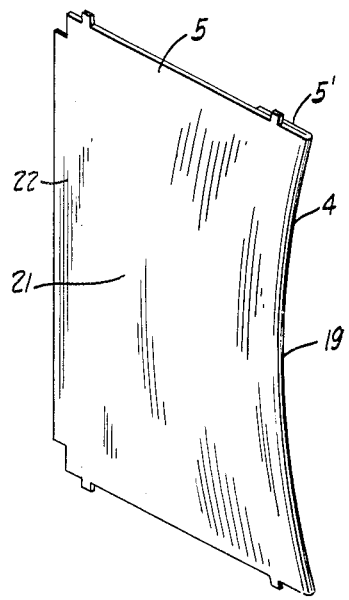
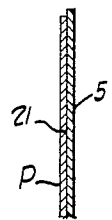
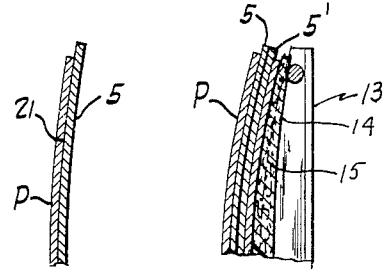
Fig. 7  Fig. 4  Fig. 5  Fig. 6
INVENTOR.
EARL O. SCHWEITZER
BY
ATTORNEY United States Patent Office 2,745,711
Patented May 15, 1956

2,745,711
STRIP CHART RECORDER

Earl O. Schweitzer, Wickliffe, Ohio, assignor to The Swartwout Company, Cleveland, Ohio, a corporation of Ohio Application August 8, 1952, Serial No. 303,370

19 Claims. (Cl. 346—116)

This invention relates to recording apparatus and in particular to improvements in strip chart recorders.

My invention is concerned with improved strip chart recording apparatus wherein a continuous strip or band of recording paper is disposed to move rectilinearly relative to a stylus or marking pointer supported for movement arcuately across the recording strip in response to variations in conditions such as temperature, pressure, flow and/or level, to be recorded. In such recording apparatus, the stylus is generally and conveniently supported for pivotal recording movement so that the marking point will move in an arcuate path while the strip chart is moving rectilinearly in a plane so that equal increments of arcuate motion of the recording stylus are not recorded in equal increments of transverse measurements on the chart. The problem of obtaining a direct reading from the trace of a pivotal stylus on such recording paper has long perplexed the art. My invention solves this problem among others.

Another problem with which the art has been perplexed is that of legibility and arrangement of the stylus, stylus arm and actuating mechanism with respect to the chart and record. Heretofore the stylus arm has generally been disposed parallel to the plane of the chart strip with consequent longitudinal extension of the face and bulk of the appartus, or where the arm has been disposed normal to the plane of the observable strip to reduce the frontal area of the device, complicated mechanical motion of the arm and stylus were required or alternatively the record made by the stylus was not immediately observable and the chart failed to present an immediate and presently observable record. My invention also solves this problem.

One of the objects of my invention is to provide strip chart recording apparatus in which arcuate stylus movements may be accurately recorded in direct and accurate linear proportion on a rectilinearly moving chart. Another object is to provide recording apparatus wherein the recording trace on the chart paper is visible from the moment of its inscription and thereafter throughout the full width of the face of the instrument. A further object is to provide recording apparatus in which at all times the reading of present instantaneous values of the conditions being measured is afforded without however encumbering the face of the instrument with the recording arm, inkwell, stylus or actuating mechanism. Another object is to provide linear recording apparatus that is simple in design, economical to manufacture, and has substantially no greater frontal area than the face of the chart and record. Another object is to provide a strip chart recorder with the stylus arm and actuating mechanism behind the desirably visible portion of the chart with the stylus per se visible so that its motion as well as its trace can be continuously observed. Another object is to provide a strip chart recorder in which the strip is caused to travel around an arcuate edge corresponding to the arc of the stylus in a plane normal to the visible face of the chart with the stylus inscribing the strip at the arcuate edge whereby the inscription becomes immediately visible as the strip turns and advances from the edge to the visible face of the chart and whereby the inscribed trace is free of distortion and truly proportionate to the angular motion of the stylus arm.

These and other objects of the present invention will become apparent from the following description of a preferred form thereof, reference being had to the accompanying drawings in which Figure 1 is a perspective view of part of recording apparatus embodying the present invention; Figure 2 is a front view of the apparatus of Figure 1; Figure 3 is an enlarged plan view of part of the apparatus of Figure 1; Figures 4, 5 and 6 are enlarged vertical sections taken on the lines 4—4, 5—5 and 6—6, respectively, of Figure 3; Figure 7 is a perspective view of the plate or backing member which forms a part of my invention; and Figure 8 is an enlarged fragmentary front elevation of the chart paper as it passes over the driving sprocket.

The strip chart recording apparatus which embraces my invention comprises a base 1 on which a supply roll S of chart paper P is mounted for rotation about an axis normal to the base. The strip chart is an elongated band of recording paper marked or scaled preferably in rectangular co-ordinates, the ordinate representing the value of the variable being measured, the abscissa representing time. The strip or band of paper passes from the supply roll as indicated by the arrows in Figure 1, and reverses its direction of travel around a side edge 4 of a backing member or chart plate 5 which is rigidly secured to and extends substantially normal to the base 1; the paper continuing across the face of the plate 5, around a drive sprocket D, and finally winding around a take-up spool F arranged to rotate with the same peripheral speed as that of the driving sprocket.

In order to facilitate movement of the paper over and in uniform contact with the side edge 4 of chart plate without slippage and/or uneven stressing of the paper, I prefer that the drive sprocket have two vertically spaced sets of peripheral teeth 6 which are adapted to engage corresponding rows of perforations 7 in the chart adjacent the top and bottom edges of the chart. Preferably the perforations 7 are larger in diameter than the sprocket teeth 6 as shown in Figure 8 so as to permit the chart paper to move vertically relative to the teeth 6 when the paper expands and shrinks in response to changes in ambient humidity. The advantage of providing oversize sprocket drive holes 6 along the top and bottom of the paper is that errors in the record resulting from expansion and shrinkage of the paper are minimized and are practically neutralized at about mid-height on the chart which generally is the zone which passes under the inscribing pen. That is to say, the paper being free to move vertically at its top and bottom edges, tends to expand or shrink equally relative to a longitudinal neutral axis at about mid-height on the chart. The drive sprocket D rotates at a constant speed and thus moves the paper around and across the backing member 5 at a constant velocity which corresponds to the time scale, i. e., the abscissa, of the chart.

In order to plot or inscribe the values of the measured condition as ordinates on this chart, I provide an elongated marking or stylus arm 10 which carries a stylus or mark pen 11 at one end adjacent the side edge 4 of backing plate 5 and is supported at the opposite end 12 remote from and normal to the plate for pivotal movement about an axis A which extends substantially parallel to the direction of movement of the chart paper over the plate 5. Pivotal movement of the pen arm 10 which is accurately responsive to variations in the condition being measured may be effected by any suitable motive power means such as a bellows, motor, Bourdon tube or, as indicated in the drawings by a conventional rotary solenoid T whose rotor is coupled to the marking arm 10 and whose primary winding is connected to a suitable measuring element, not shown. The measuring element measures the instantaneous values of the particular condition being measured and recorded and transmits an electrical signal proportional to those values to the rotary solenoid T which causes the marking arm 10 to be rotated proportionally and the pen 11 to mark the chart paper against which it is disposed to bear. That is to say, the stylus arm 10 is given angular motion about the axis A which is accurately proportional to the changes in values to be recorded.

As mentioned above it is desirable that the ordinate scale on the chart paper be accurately proportional to pen arm movement and rectilinear to facilitate computation and analysis of the data recorded thereon. In order that the marking pen or stylus 11 as it moves in a circular arc shall accurately and linearly inscribe the record trace, the chart paper at the point where it passes under the stylus is abruptly curved or bent back upon itself in the direction of its length through substantially 180° around the arcuately curved side edge 4 of the chart plate 5. The side edge 4 of this plate is curved outwardly uniformly throughout the width of the plate on an arc struck from the axis A as a center, Figures 1 to 7, in such a manner that the stylus as it moves in its arcuate path will follow arcuate edge 4 and contact the fold of the paper overlying the edge. Thus the chart paper P as it moves around the plate side edge 4 of the plate 5 is caused to assume an arcuate contour corresponding substantially to the arcuate path through which the stylus 11 moves. The movement of the stylus therefore will be directly linear with respect to the rectilinear chart scale while the latter is on the edge 4, and the values of the measured condition will be accurately recorded thereon in true proportion to the angular movement of the arm 10.

The side edge 4 of the chart plate 5 around which the chart paper moves is smoothly rounded to avoid snagging or tearing the paper, but is rounded on a small radius whereby to turn and crease the paper around the edge acutely so that the inscription from the stylus will have but a very short distance to travel before appearing "around the corner" from the edge. This edge should also be relatively thin and/or abrupt to insure that the chart paper, while being simultaneously bent around the edge 4 and bulged outwardly, will conform closely to the compound curves of the plate and will not wrinkle, kink or become otherwise undesirably stressed or distorted. To accomplish this, I provide an adjustable contour bracket 13 having a convexly shaped face 14 disposed adjacent the back side of the chart plate near the side edge 4 thereof. The face 14 of the contour bracket extends the full arcuate height of the chart plate and preferably is formed to the shape of a circular arc corresponding to the curvature of the portion of the chart plate adjacent thereto and preferably is lined with felt 15 or other suitably resilient material to press the chart paper into uniform contact with the chart plate. The bracket is mounted on the base 1 by means of screws 16 which extend through holes 17 in bracket flange 18; the holes 17 being slotted to provide for adjustment of the bracket relative to the chart plate. The contour bracket is normally positioned so that the felt liner 15 will press the moving curving chart paper as it comes off supply roll S firmly against the back side of the chart plate immediately ahead of the side edge 4 to insure uniform contact between the paper and the chart when the former passes around side edge 4 and under inscribing stylus 11.

To further insure close conformation of the moving chart paper to the compound curves of the chart plate and especially around the side edge 4 thereof, I prefer that the side edge 4 be smooth and rounded and have a relatively small radius of curvature. That is to say, the radius of longitudinal curvature of side edge 4 is small relative to the operative length of pen arm 10. For example, a side edge radius of about $\frac{1}{32}''$ and thickness in the order of $\frac{1}{16}''$ for an 8" pen arm gives satisfactory results. For this purpose, a single metallic sheet having a thickness of $\frac{1}{16}''$ may be used for the chart plate; or, as is shown in the drawings, a single sheet $\frac{1}{32}''$ in thickness and preferably folded or bent back on itself as indicated at 16 may be used, thus providing a corner having a sufficiently small radius of curvature to give satisfactory results. The portions of the surface of the plate over which the chart paper passes preferably have a smooth finish as may be obtained by chrome plating, in order to reduce drag on the moving paper to a minimum.

As viewed in the drawings the plate 5 has its rightward edge 4 as described above of arcuate form, but its leftward edge adjacent the driving sprocketed roll D is preferably straight and parallel with the axis of the roll. To this end the rightward portion of the plate 5 with its returned portion 5' is pressed or formed to a substantially circular arcuate or bulged form as at 19, see Figures 3 and 7, with the axis A as the center of the arcuate portion at the side edge 4; the radius of plate curvature increasing from right to left as viewed so that the arcuate form tends to become more flat in proportion to the distance from the side edge 4 until the curved portion of the plate merges smoothly into the planar portion thereof, throughout the full height of the plate and a substantial distance from the rightward edge as shown in Figure 3.

The supply roll S from which the chart paper is drawn is located closely adjacent and to the rear of the chart plate 5. As the chart is drawn off the supply roll it begins to assume a concavo-convex shape as indicated at 20 in Figure 3 corresponding to the concavity of the backside of the rightward portion of the plate and the side edge 4. As the chart moves toward the edge 4 of the plate, the concavity of the chart sheet becomes more pronounced until the chart sheet passes over the concave felt face 15 of contour bracket 13 which resiliently press the chart into engagement with the plate so that the chart will conform entirely to the concave shape of the edge 4 and will uniformly contact the edge throughout the width, i. e., height as viewed in Figures 1 and 2, of the chart. After the chart sheet has moved around the edge and under the stylus 11 and to and toward the leftward portion of the plate 5, it gradually and smoothly unbends, see Figures 5 and 6, and assumes a planar shape, see Figure 4, whence the chart passes on to and around the driving sprocket D and finally winds upon the cylindrical take-up spool F. This curving and unbending of the chart paper in such a manner that the chart will desirably lay uniformly against the front surface 21 of the chart plate 5, is facilitated and better controlled by reason of the shape and contour of the chart plate wherein degree of convexity thereof diminishes progressively at increasing distances from the side edge 4 until the remote edge portion 22 of the plate is substantially planar shaped, see Figure 4, as described above.

An important advantage of the present invention is that the trace or record made by the stylus on the chart paper is visible throughout the exposed width of the face of the instrument and that this record may be observed on the chart from the very moment of its inscription without obstruction or concealment by or from any inscribing or other instrumentality. The pen point or stylus 11 contacts the chart sheet P at the moment the chart is moving in a direction substantially transverse to the pivotal axis A of the marking arm 10 and immediately thereafter, the chart with the record marked thereon moves around the edge 4 of the plate in full view of the observer.

The stylus 11 itself may be seen from the front of the instrument and hence its present or instantaneous position may readily be observed. Thus the reading of present or instantaneous values of the condition being measured is observable directly from the stylus. To facilitate determination of such instantaneous values, a vertically extending curved scale 23 is secured as by screws 24 to the base in juxtaposition to the curved edge 4 of the backing plate 5. The scale 23 is graduated with a scale corresponding to the ordinate scale of the chart paper. A pointer 25 mounted on the pen arm overlies the curved scale 23; the position of pointer 25 indicating the instantaneous value of the data being recorded which may be read off scale 23 opposite pointer 25.

Modifications and changes may be made in the above described apparatus by those skilled in the art without departing from the precepts and spirit of my invention. I therefore do not wish to be limited to the preferred form and embodiment of my invention as specifically illustrated and described herein nor in any manner inconsistent with the promotion of the art made by my invention. Essential features of my invention are set forth in the appended claims.

I claim:

1. Strip chart recording mechanism comprising an axis, a stylus arm mounted for pivotal movement about said axis, means for moving said arm about said axis in response to conditions to be recorded, a stylus carried by said arm transversely thereof and remote from said axis, and a plate disposed generally parallel to said axis and having an arcuately curved edge lying in a plane normal to said axis adjacent said stylus and struck from the same radius from said axis as the radius of the stylus from said axis.

2. Mechanism according to claim 1 with a strip supply roll disposed between said plate and said axis and mounted for rotation about a second axis parallel to the chord of the said edge and a strip driving member mounted on a third axis parallel to said chord and disposed near the end of said plate remote from said edge.

3. Mechanism of claim 1 in which said curved edge is smoothly rounded transversely of its major curvature on a radius of about 1/32 inch.

4. Mechanism of claim 1 with a scale disposed adjacent said edge and similarly curved and spaced therefrom to clear the stylus and show the position thereof.

5. Recording apparatus comprising, a plate member having a rounded edge and a face portion, recording paper arranged to move in the direction of its length relative to said plate in engagement with said edge and face portion, a marking arm supported for pivotal movement transversely of said paper, and marking means carried by said arm remote from the pivotal support thereof engaging and marking portions of said paper immediately overlying said edge of said plate, said edge of the plate being convexly curved as viewed from the face side of said plate, the center of curvature of said edge lying along said pivotal axis of said marking arm.

6. The apparatus according to claim 5 in which the degree of convexity of the face portion of said plate is a maximum at said edge and diminishes at distances progressively longitudinally remote from said edge.

7. The apparatus according to claim 6 in which the edge portion of said plate remote from said curved edge lies in a plane.

8. Recording apparatus comprising a band of chart paper arranged to move in the direction of its length, means to change the direction of movement of said paper substantially 180 degrees, and marking means supported for pivotal movement transversely of the direction of paper movement and adapted to mark said paper at the place where the paper changes direction, said paper at the place of its change of direction being curved to the radius of pivotal movement of said marking means.

9. Strip chart recording apparatus comprising a base, a cylindrical roll of recording paper mounted on said base with its axis normal to said base, sprocket means adapted to engage said paper to move same in the direction of its length, a plate secured to and projecting from said base, the portion of said paper extending between said roll and said sprocket being disposed to pass around and in contact with an edge of said plate, means for marking said paper in response to conditions being measured comprising an arm supported at one end for pivotal movement relative to said plate, a stylus carried by said arm at the other end thereof, means responsive to variations in the condition being measured for pivotally moving said arm, said edge of said plate having a curved shape corresponding to the arcuate path of movement of said stylus, said stylus engaging and marking said paper at the point where the paper passes over said edge of said plate.

10. Apparatus according to claim 9 in which said sprocket means has two vertically spaced sets of peripheral teeth, said recording paper having perforations along the top and bottom edges thereof to be engaged by said sets of sprocket teeth, respectively.

11. In recording apparatus, the combination of a base, a plate projecting from said base, recording paper wrapped around one edge of said plate, means to move said paper relative to said plate, marking means mounted for arcuate movement and disposed to mark the portion of said paper overlying said edge, means to move said marking means relative to said paper in response to variations of conditions being measured, said edge of said plate being curved to substantially the arc of movement of said marking means, a scale shaped to the curvature of and disposed in juxtaposition to said edge of said plate, and pointer means associated with said marking means overlying said scale to indicate instantaneous values of the conditions being measured.

12. The method of recording variations in conditions such as pressure, rate of flow, temperature, and/or level on a band of recording paper wound on a right cylindrical roll consisting of the steps of unwinding said paper from said roll and continuously moving said paper in the direction of its length, bulging said paper into an arc having a predetermined radius and simultaneously bending said paper back upon itself, marking the bulged and bent portion of said paper in response to variations in the conditions being measured, unbulging said paper, and winding said paper upon a right cylindrical spool.

13. The method of inscribing a strip chart which comprises moving the strip in one direction generally parallel to an axis, curving the moving strip transversely of its path of movement to concavo-convex substantially conical form in respect to said axis, reversing the direction of movement of the strip while in said conical form about an arc struck from said axis in a plane normal thereto, and moving a stylus about said axis substantially in said arc and in contact with said strip where its direction of movement is reversed.

14. The method of claim 13 in which the movement of the strip is reversed abruptly through substantially 180° around said arc and upon a radius of curvature of about 1/32 inch.

15. A strip chart recorder having a strip chart, means to move said chart in the direction of its length, and a member having an edge extending transversely of the direction of movement of said chart and being transversely curved, said chart curving, engaging and moving around said edge whereby said chart is shaped to the curvature of said edge as the direction of movement of said chart is substantially reversed.

16. In a strip chart recorder having a stylus arm movable about an axis, a strip chart, a plate having a portion thereof curved transversely of said axis and having a curved edge, and means to move said chart to, around and from said edge, said chart being curved to the shape of said edge as the chart moves around the edge.

17. In a strip chart recorder having a stylus arm movable about an axis, a strip chart movable in the direction of its length, and a plate over which said chart is disposed to pass, said plate having an edge thereof curved on an arc having a radius with a center on the axis of said stylus arm, said chart being arranged to reverse its direction of movement around and in close contact with said curved edge of said plate.

18. The method of controlling the shape of a strip chart in a strip chart recorder having a supply reel and a winding reel characterized by moving the chart from the supply reel in the direction of the length of said chart, causing the chart to assume a transversely cylindrical shape while moving, abruptly changing the direction of movement of said chart while in said cylindrical shape, and winding said chart on said winding reel.

19. The method of controlling the shape of a strip chart in a strip chart recorder having a supply reel and a winding reel characterized by moving said chart from said supply reel in one direction to a transversely arcuate line, causing said chart to conform to the arcuate shape of said line, passing said chart around said arcuate line while reversing the direction of movement of said chart and winding said chart on said winding reel.

References Cited in the file of this patent

UNITED STATES PATENTS

| | | |
|---|---|---|
| 1,071,192 | Von Voss | Aug. 25, 1913 |
| 1,967,080 | Dietze | July 17, 1934 |
| 2,077,242 | La Pierre | Apr. 13, 1937 |
| 2,340,317 | Finch | Feb. 1, 1944 |
| 2,594,136 | Di Maggio | Apr. 22, 1952 |

FOREIGN PATENTS

| | | |
|---|---|---|
| 621,611 | Germany | Nov. 9, 1935 |